Dec. 6, 1955          W. A. GOSS          2,726,059

MOWER DRAG LINK SUPPORTING BRACKET

Original Filed March 7, 1951

INVENTOR.
WILLIAM A. GOSS
BY
ATTORNEYS

United States Patent Office 2,726,059
Patented Dec. 6, 1955

2,726,059

MOWER DRAG LINK SUPPORTING BRACKET

William A. Goss, Zanesville, Ohio, assignor to Detroit Harvester Company, Detroit, Mich., a corporation of Michigan Original application March 7, 1951, Serial No. 214,337. Divided and this application May 27, 1952, Serial No. 290,238

4 Claims. (Cl. 248—251)

The present invention relates to a mower drag bar support.

The present invention is a division of my prior copending application, Serial No. 214,337, filed March 7, 1951.

It is an object of the present invention to provide support means for the drag bar of a mower adapted to provide for vertical swinging movement of the drag bar, limited rearward swinging movement of the drag bar, and angular adjustment of the drag bar about its axis.

It is a further object of the present invention to provide a drag bar support characterized by the presence of resilient means between the drag bar and the support.

It is a further object of the present invention to provide a drag bar support comprising a hinge support arm completely mounted in resilient means for limited universal movement.

Other objects and features of the invention will become apparent as the description proceeds, especially when taken in conjunction with the accompanying drawings, wherein.

Figure 1:
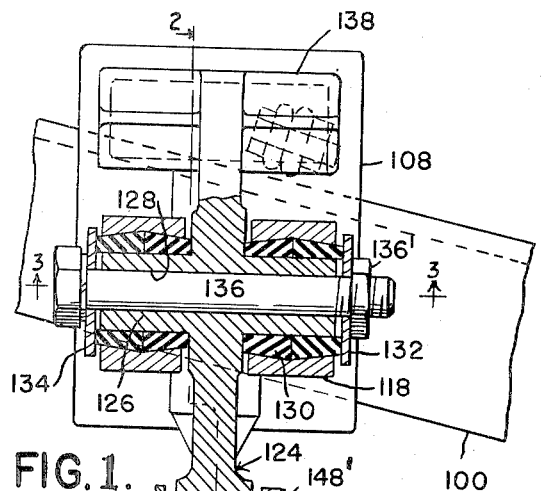
Figure 1 is an enlarged sectional view of the drag bar support taken substantially on the line 1—1, Figure 2.
Figure 2:
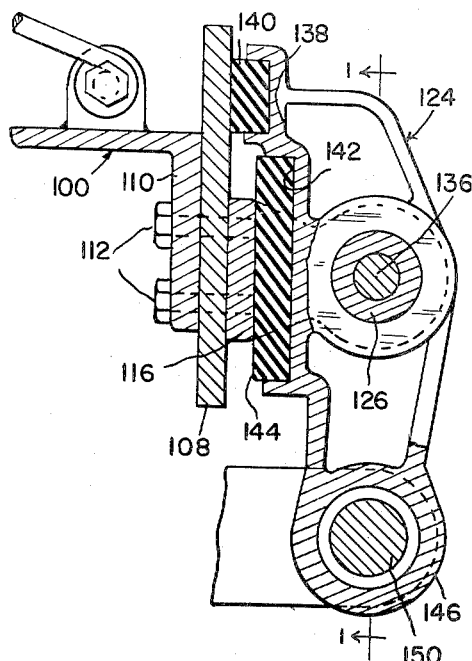
Figure 2 is a sectional view through the drag bar support taken substantially on the line 2—2, Figure 1.
Figure 3:
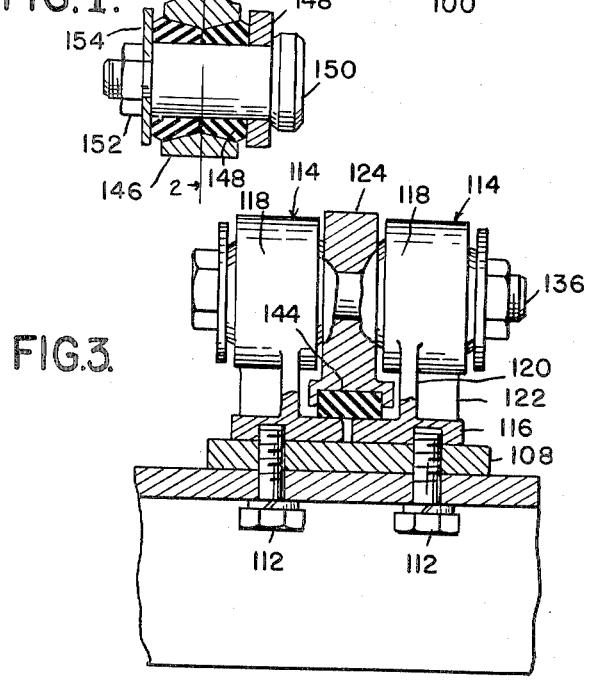
Figure 3 is a fragmentary sectional view through the drag bar support taken substantially on the line 3—3, Figure 1.

The mechanism for supporting the drag bar of a mower with provision for the movements desired, is illustrated in Figures 1, 2 and 3. As seen in these figures there is provided at the right hand side of the machine a support bar 100 in the form of an angle iron bolted or otherwise secured to the frame of the tractor. Suitably mounted on the support bar 100 is a flat support plate 108, this plate being illustrated as bolted to a vertical flange 110 of the support bar 100 by bolts 112. On the outer surface of the plate 108 are a pair of independent pivot supports 114 each of which includes a flat flange 116 and a circular sleeve or bearing portion 118 interconnected by webs 120 and 122. The webs 120 and 122 of the two pivot supports 114 are separated a substantial distance but the flanges 116 are in close proximity, as best illustrated in Figure 3. The bolts 112 previously referred to extend through the flat plate 108 and are threaded into suitably tapped recesses in the flanges 116 as clearly appears in Figure 3.

A hinge support arm 124 is mounted between the circular bearing portions 118 of the pivot supports 114. The hinge support arm 124 includes a pair of oppositely extending tubular portions 126, an opening 128 being provided which extends completely through the central portion of the hinge support arm 124 and through the lateral extensions 126 thereof. The extensions 126 of the hinge support arm are received in the openings in the bearing portions 118 of the pivot supports 114. Located within the bearing portions 118 and surrounding the tubular extensions 126 are pairs of tapered bushings 130. The bushings 130 are formed of rubber or other suitable material. As best seen in Figure 1, the bushings 130 extend laterally beyond the ends of the bearing portions 118. At the inner ends of the bearing portions the bushings 130 engage the sides of the hinge support arm 124. At the outer ends of the bearing portions 118 the bushings 130 extend beyond the ends of the bearing portions 118 and engage washers 132 and 134. The assembly is completed by an assembly bolt 136 constituting a pivot pin extending through the opening 128 in the hinge support arm, a nut 136' being provided to clamp the washers 132 and 134 against the projecting ends of the resilient bushings 130. Accordingly, the solid metallic portions of the hinge support arm 124 are everywhere spaced from the solid metallic portions of the pivot supports 114 and due to the resilience of the bushings 130 the hinge support arm has limited universal movement relative to the support plate 108 and the pivot supports 114.

Located above the tubular projections 126 of the hinge support arm is a recessed portion 138 forming a seat in which is received a pad 140 of resilient material such for example as rubber. The pad 140 is retained in the seat and bears against the outer surface of the plate 108.

In addition, the central portion of the hinge support arm 124 is formed to provide a recessed seat 142 in which is received a pad 144 of resilient material such for example as rubber. As best seen in Figures 2 and 3, the pad 144 rests against the flanges 116 of the pivot supports 114.

As a result of the foregoing construction the hinge support arm 124, while mounted between a pair of pivot supports 114, is prevented from substantial rocking movement about the axes of the pivot supports by the provision of the resilient pads 140 and 144. However, these pads are yieldable and permit limited universal movement of the hinge support arm relative to the support plate 108 and the pivot supports 114. Moreover, the inner position of the resilient bushings and pads as described, prevents all metallic contact between the hinge support arm 124 and the rigid structure which carries the hinge support arm. Thus, the hinge support arm is fully cushioned in a manner to take up shocks during operation of the tractor-mower.

The lower end of the hinge support arm 124 includes an enlarged eye 146. A metal strap 148' has an opening therethrough for the reception of an assembly bolt 150 which, as illustrated in Figure 1, extends through the opening in the eye 146 of the hinge support arm 124. The opening in the eye 146 is enlarged and receives a pair of tapered bushings 148 of rubber or other resilient material. The bushings 148 have an axial dimension such that they extend substantially beyond the ends of the opening in the eye 146. A nut 152 is provided on the bolt 150 and has associated therewith a washer 154, the nut and bolt thus clamping the end of the strap 148 and the washer 154 against the projecting ends of the bushings 148' as clearly illustrated in Figure 1. As a result of this arrangement the strap 148' is mounted for vertical swinging movement relative to the hinge support arm 124 but is fully cushioned therefrom by the interposition of the bushings 148. Moreover, due to the resilient nature of the bushings, the strap has limited universal movement with respect to the hinge support arm 124. Thus, the strap 148' has limited universal movement relative to the hinge support arm 124 and the hinge support arm in turn has limited universal movement relative to the fixedly mounted support plate 108 and pivot supports 114.

The drawings and the foregoing specification constitute a description of the improved mower drag bar and support therefor in such full, clear, concise and exact terms as to enable any person skilled in the art to practice the invention, the scope of which is indicated by the appended claims.

What I claim as my invention is:

1. Mounting means for the drag bar of a tractor mower comprising a vertically disposed flat mounting plate adapted to be rigidly secured to a part of a tractor, a pair of pivot supports carried by said mounting plate, said pivot supports including spaced apart, axially aligned horizontally extending sleeves, resilient bushings in said sleeves having inner and outer end portions extending beyond the ends of their respective sleeves, a hinge support arm having an opening intermediate its ends and laterally extending aligned tubular portions having openings aligned with the opening in said arm, said tubular portions being received in said bushings and terminating short of the outer ends thereof, a pivot pin extending through said openings, abutment means on said pin engaging the outer ends of said bushings, said arm having a downwardly extending portion adapted to be pivotally connected to a mower drag bar.

2. Mounting means for the drag bar of a tractor mower comprising a vertically disposed flat mounting plate adapted to be rigidly secured to a part of a tractor, a pair of pivot supports carried by said mounting plate, said pivot supports including spaced apart, axially aligned horizontally extending sleeves, resilient bushings in said sleeves having inner and outer end portions extending beyond the ends of their respective sleeves, a hinge support arm having an opening intermediate its ends and laterally extending aligned tubular portions having openings aligned with the opening in said arm, said tubular portions being received in said bushings and terminating short of the outer ends thereof, a pivot pin extending through said openings, abutment means on said pin engaging the outer ends of said bushings, said arm having an upwardly extending portion having a pocket therein located entirely above said tubular portions and facing said plate, a pad of resilient material in said pocket and engaging said plate, said arm having a downwardly extending portion adapted to be pivotally connected to a mower drag bar.

3. Mounting means for the drag bar of a tractor mower comprising a vertically disposed flat mounting plate adapted to be rigidly secured to a part of a tractor, a pair of pivot supports carried by said mounting plate, said pivot supports including spaced apart, axially aligned horizontally extending sleeves, resilient bushings in said sleeves having inner and outer end portions extending beyond the ends of their respective sleeves, a hinge support arm having an opening intermediate its ends and laterally extending aligned tubular portions having openings aligned with the opening in said arm, said tubular portions being received in said bushings and terminating short of the outer ends thereof, a pivot pin extending through said openings, abutment means on said pin engaging the outer ends of said bushings, said arm having an upwardly extending portion having a pocket therein located entirely above said tubular portions and facing said plate, a pad of resilient material in said pocket and engaging said plate, the portion of said arm above and below said tubular portions and at the side thereof adjacent said plate having a second pocket therein, a second pad of resilient material in said second pocket and compressed between said plate and said second pocket, said arm having a downwardly extending portion adapted to be pivotally connected to a mower drag bar.

4. Structure as defined in claim 3 in which said pivot supports comprise mounting flanges secured to said plate including portions extending toward each other, and in which said second pad engages said flanges.

References Cited in the file of this patent

UNITED STATES PATENTS

| | | |
|---|---|---|
| 1,917,797 | Harris | July 11, 1933 |
| 2,043,015 | Shutts | June 2, 1936 |
| 2,048,338 | Hume | July 21, 1936 |
| 2,311,095 | Simpson et al. | Feb. 16, 1943 |
| 2,414,743 | Kaemmerling | Jan. 21, 1947 |